United States Patent [19]

Abbott

[11] Patent Number: 5,219,436
[45] Date of Patent: Jun. 15, 1993

[54] TRAILER HITCH ASSEMBLY AND RELATED METHOD

[76] Inventor: Vance Abbott, 265 E. 400 North, Spanish Fork, Utah 84660

[21] Appl. No.: 754,007

[22] Filed: Sep. 3, 1991

[51] Int. Cl.⁵ .............................................. B60D 1/00
[52] U.S. Cl. ..................... 280/512; 280/510
[58] Field of Search ............... 280/507, 504, 510, 509, 280/511–513, 478.1, 479.2, 479.3, 417.1, 423.1

[56] References Cited

U.S. PATENT DOCUMENTS

| | | | |
|---|---|---|---|
| 2,696,392 | 12/1954 | Case | 280/513 |
| 2,755,105 | 7/1956 | Wells | 280/513 |
| 4,320,907 | 3/1982 | Eaton | 280/423.1 X |

FOREIGN PATENT DOCUMENTS 537500  6/1941  United Kingdom ................ 280/511

*Primary Examiner*—Charles A. Marmor
*Assistant Examiner*—Florian Zeender
*Attorney, Agent, or Firm*—Bryan A. Geurts

[57] ABSTRACT

A trailer hitch assembly is provided for coupling a trailer to a vehicle, the lead vehicle being equipped with a standard ball-type hitch, and the trailer hitch assembly comprising a body securely attached to the trailer, the interior surface thereof forming a cylindrical cavity, the cylindrical cavity being open at one end thereof for insertion of the ball-type hitch and the opposite end thereof being closed, the interior surface at the closed end forming a curved surface which substantially conforms to a portion of the ball-type hitch; a plurality of steel balls rotatably embedded within the body such that a portion of each steel ball extends through the interior surface of the body into the cavity to secure the ball-type hitch within the cavity; and retraction means for temporarily retracting the steel balls completely within the body to allow ingress and egress of the ball-type hitch into and out of the cavity, respectively. Advantageously, a biased, rotatable collar facilitates retraction of the steel balls by allowing alignment of recesses in the retractable collar with recesses formed in the body.

1 Claim, 3 Drawing Sheets

TRAILER HITCH ASSEMBLY AND RELATED METHOD

BACKGROUND

1. Field

This invention relates generally to the field of trailer hitches and more specifically to a novel mechanical assembly, and related method, for rotatably coupling a trailer to a lead vehicle.

2. Prior Art

Trailer hitch assemblies have become commonplace in today's society, connecting a variety of different trailers to lead vehicles which supply driving power as well as steering capabilities to the trailer. Perhaps most popular among the trailer hitch assemblies known and used are those which attach temporarily to a ball-type hitch attached to the rear of the lead vehicle, for example on the rear bumper.

Such a ball-type hitch comprises generally a ball, usually between 1¾ and 2 inches in diameter, a shank portion, and a threaded shaft. In customary usage, the threaded shaft is inserted through an aperture in the rear bumper of the lead vehicle, such that the ball extends upwardly therefrom. An appropriate lock-washer and nut are used to tighten and lock the ball-type hitch in this position.

Alternatively, the ball-type hitch may be mounted in the bed of the pick-up truck, near the center thereof, so as to accommodate attachment of a typical gooseneck trailer. When mounted in the bed of a pick-up truck, it is advantageous to use a ball-type hitch which is securely attached to the frame of the pick-up truck.

As mentioned, a number of different trailer hitch assemblies are known and used in the prior art whereby a trailer, which has a trailer hitch assembly securely attached at one end of the trailer, is rotatably attached to the above described ball-type hitch assembly which is securely mounted to the lead vehicle. State of the art trailer hitch assemblies generally include means for securing the assembly to the ball-type hitch such as a locking screw or a locking cap. While generally effective for their stated purposes, state of the art trailer hitches include a number of disadvantages as well.

For example, the means whereby the trailer hitch assembly is secured to the ball-type hitch may release at inopportune times when being jolted or jostled in the normal routine of pulling a trailer with a lead vehicle. Such unwanted releases can be dangerous, and even fatal, not only to those associated with the lead vehicle and trailer, but to innocent bystanders as well.

Further, many of the known trailer hitch assemblies in use are subject to wear and tear of component parts which adversely affect their performance. This can present a dangerous situation similar to that mentioned in the previous paragraph, when the worn component parts fail during times of stress and strain. This can be a particular concern when the trailer is to be attached to and unattached from the lead vehicle several times within a short period of time.

Moreover, many of the prior art trailer hitches are difficult to attach to and unattach from the lead vehicle. Many require considerable time and effort to effect the attachment or unattachment, which is particularly disadvantageous when this must be done several times each day. Such time and effort wasted on attachment and unattachment of the trailer can be much better spent in other ways.

Finally, and perhaps most importantly, most prior art trailer hitches do not accommodate universal rotational movement of the trailer hitch assembly about the ball-type hitch. Because of this, undue stress and strain may be placed on the trailer hitch assembly when the lead vehicle is negotiating uneven or rough roads. Such stress and strain can also add to the wear and tear of component parts, as mentioned above, which creates a dangerous situation.

Therefore, there is a legitimate need in the art for a trailer hitch assembly which solves the aforementioned problems, and in particular allows for universal rotational movement about the ball-type hitch attached to a lead vehicle.

BRIEF SUMMARY AND OBJECTS OF THE INVENTION

Accordingly, it is a principal objective of the present invention to provide a trailer hitch assembly which allows universal rotational movement about a standard ball-type hitch which is attached to the rear or to the bed of a standard pick-up truck or similar lead vehicle.

Another major objective of the present invention is to provide a trailer hitch assembly which can be attached to and unattached from a lead vehicle with a minimum of effort and time.

A still further principal objective of the instant invention is to provide a trailer hitch assembly which minimizes or effectively eliminates wear and tear on component parts.

Yet another important objective is to provide a trailer hitch assembly which is relatively inexpensive, easy to manufacture, easy to install, durable, and easy to use.

These and other objects and features of the invention are represented in a preferred embodiment of the invention described below. In general, the trailer hitch assembly comprises a body which includes a cylindrical cavity, a plurality of steel balls rotatably imbedded within the body, and retraction means for temporarily retracting the steel balls within the body to allow ingress and egress of the ball-type hitch into and out of the cavity, respectively.

The body is securely attached to the trailer to be towed by the lead vehicle and further includes interior and exterior surfaces. The interior surface thereof forms the cylindrical cavity, the cylindrical cavity being open at one end thereof for insertion of the ball-type hitch and the opposite end being closed, the interior surface at the closed end forming a curved surface which substantially conforms to a portion of the ball-type hitch. Each of the steel balls is rotatably imbedded within the body such that a portion of each steel ball extends through the interior surface of the body into the cavity to secure the ball-type hitch within the cavity. As mentioned, the retraction means draws the steel balls completely within the body to allow passage thereby of the ball-type hitch.

Advantageously, the body further includes a recess for each steel ball and a biased, rotatable collar which rotatably secures the steel balls therein. The rotatable collar can be actuated to a position wherein the recesses and the steel balls are in alignment to allow the steel balls to retract into the recesses when the ball-type hitch passes thereby during ingress and egress into and out of the cavity, respectively.

Preferably, the rotatable collar further includes a biased lever for actuating the rotatable collar into a position wherein the recesses and the steel balls are in alignment, the lever preferably being operable from a location remote from the rotatable collar.

DESCRIPTION OF THE DRAWINGS

The embodiment of the invention briefly described above is illustrated in the accompanying drawings, wherein.

DETAILED DESCRIPTION

Reference is now made to the drawings wherein like numerals are used to denote like component parts throughout. The preferred trailer hitch assembly, generally designated 10, comprises a body 12 which is securely attached to the trailer (not shown) to be coupled to the lead vehicle (not shown), and a plurality of steel balls, each designated 14, which are rotatably imbedded within the body 12. Each of these components will be described in greater detail hereafter.

Figure 1:
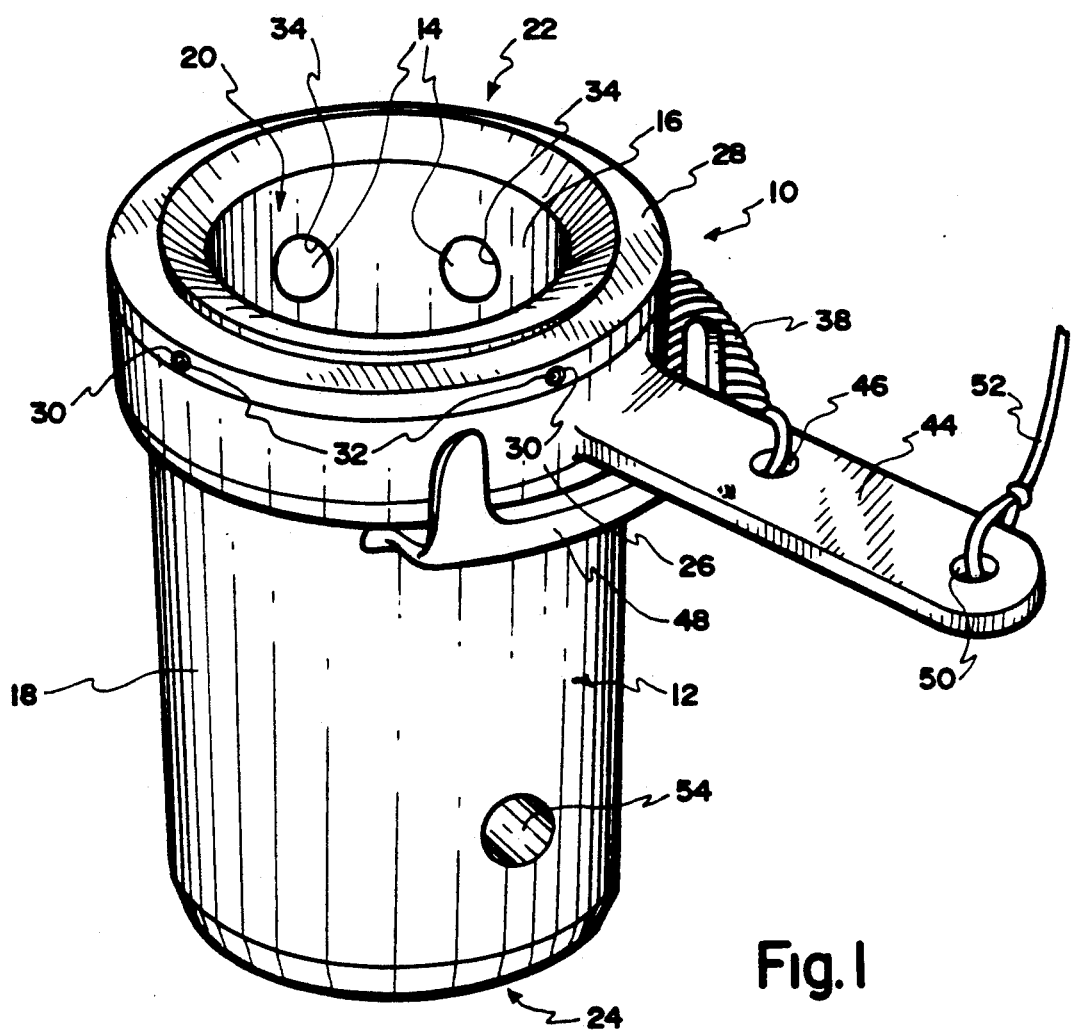
FIG. 1 is a front perspective view, according to the present invention, of the preferred trailer hitch assembly.

The body 12 is generally cylindrical in shape, at present preference, although one skilled in the art will recognize that the shape of the body 12 is in many respects a design preference. See FIG. 1. The body 12 is advantageously constructed of steel or steel alloy or a similar structural material.

Further, the body 12 comprises interior and exterior surfaces 16 and 18 respectively, the interior surface 16 forming a cylindrical cavity 20. The cylindrical cavity 20 includes an open end 22 and a closed end 24. The open end 22 of the cylindrical cavity 20 allows for insertion of the ball-type hitch (not shown), the steel balls 14 securing the ball-type hitch within the cavity 20, as described hereafter in greater detail.

Figure 2:
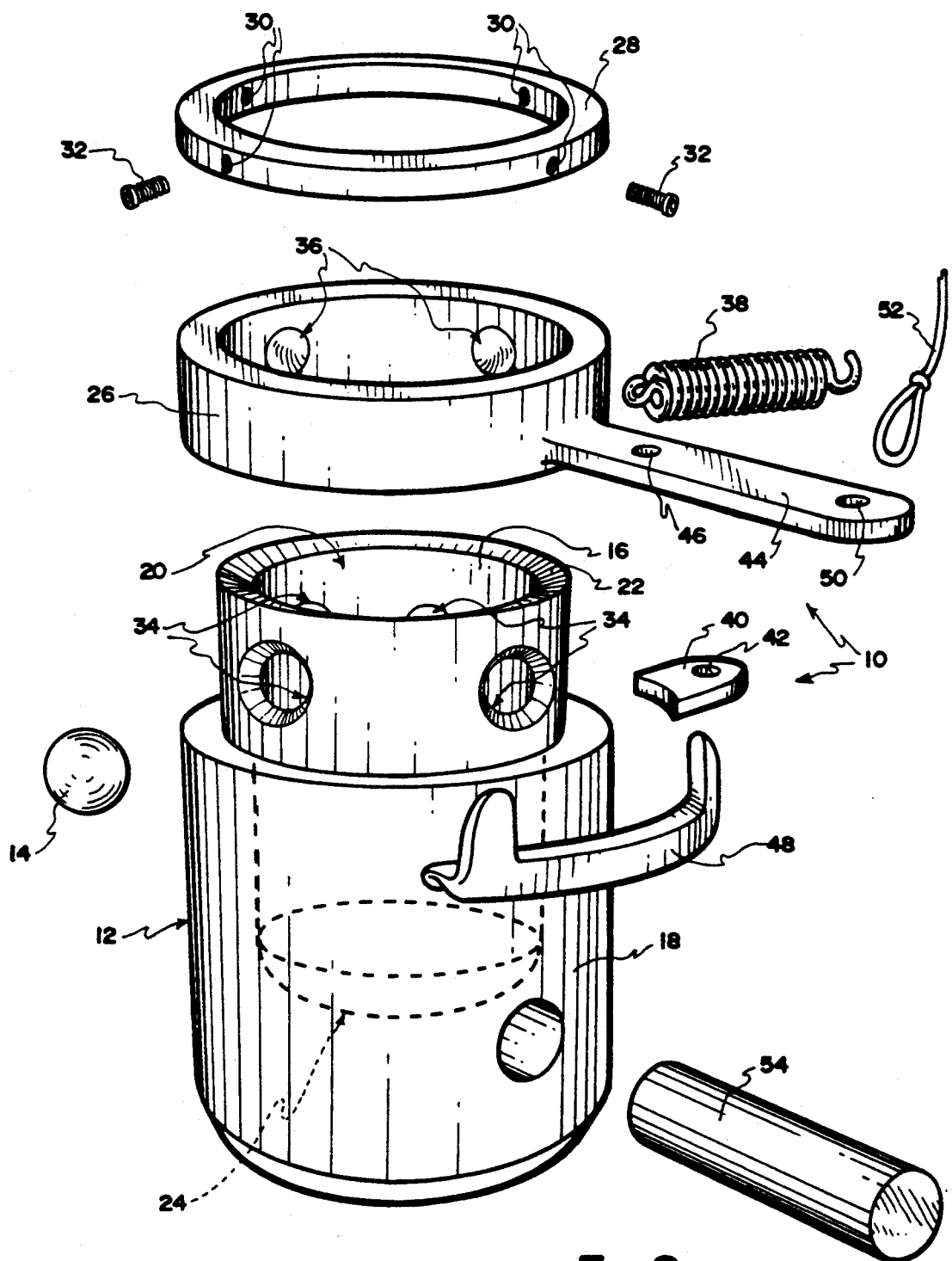
FIG. 2 is an exploded perspective view of the invention of FIG. 1.

The interior surface at the closed end 24 illustrated schematically in FIG. 2 forms a curved surface which substantially conforms to the upper spherical portion of the ball-type hitch. In this manner, the upper spherical portion of the ball-type hitch which contacts the curved surface of the closed end 24 of the cylindrical cavity 20 acts as a universal joint which allows movement in all rotational directions. Such a universal joint provides the advantage of allowing the wheels of the lead vehicle to be in a different plane than the wheels of the trailer at any given moment.

The body 12 also comprises a rotatable collar 26 which is rotatably attached to the body 12 by a retention ring 28. Preferably, the retention ring 28 includes apertures 30 spaced about its perimeter, the apertures 30 being threaded. Matching Allen screws 32, or similar threaded bolts, pass through the apertures 30, the ends thereof contacting the exterior surface 18 of the body 12.

One skilled in the art will recognize that the use of the retention ring 28 is merely one contemplated manner in which the rotatable collar 26 may be rotatably secured in place. Other similar manners not described herein fall within the scope of this invention.

As mentioned above, each steel ball 14 is rotatably embedded within the body 12 in recesses 34. The rotatable collar 26 rotatably secures the steel balls 14 in position within the recesses 34 and also includes a recess 36 for each steel ball 14. The recesses 36 in the rotatable collar 26 are slightly off-set from the recesses 34 in the body 12, except during ingress and egress of the ball-type hitch into and out of the cylindrical cavity 20, respectively.

Figure 3:
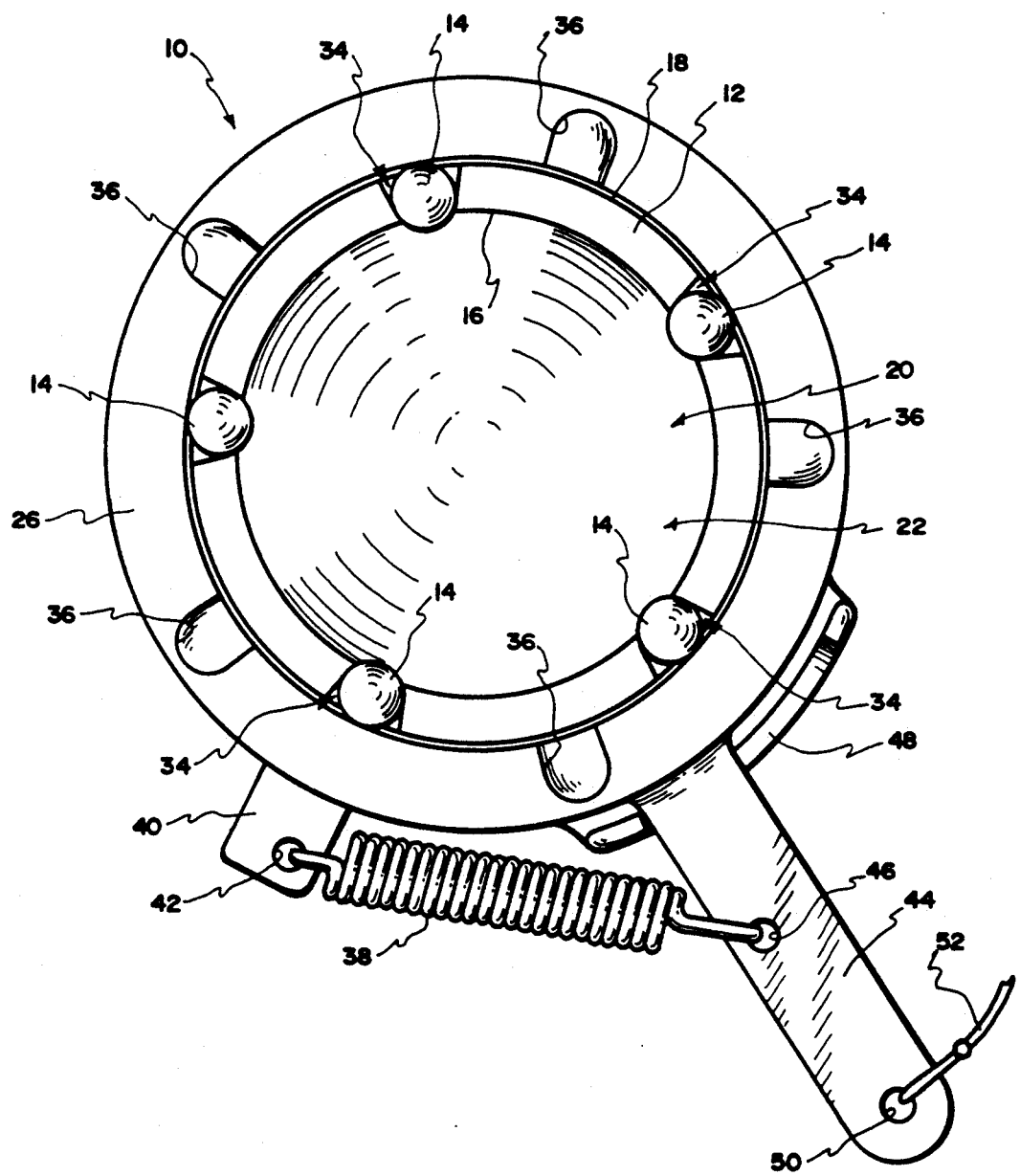
FIG. 3 is a top plan view of the invention of FIG. 1.

Thus, as best seen in FIG. 3, the steel balls 14 are embedded within the recesses 34 of the body 12 such that a portion of each steel ball 14 extends through the interior surface 16 of the body 12 into the cylindrical cavity 20 to secure the ball-type hitch within the cavity 20. The rotatable collar 26 secures the steel balls 14 in this position.

However, during ingress and egress of the ball-type hitch into and out of the cavity 20, respectively, the rotatable collar 26 can be actuated to a position wherein the recesses 36 and the steel balls 14 are in alignment to allow the steel balls 14 to retract into the recesses 36 when the ball-type hitch passes thereby.

Advantageously, the rotatable collar 26 is biased in a position in which the steel balls 14 and the recesses 36 are not in alignment by a spring 38. In such a biased position, the opportunity for slippage of the collar 26 when the ball-type hitch is contained within the cylindrical cavity 20 is minimized.

At present preference, one end of the spring 38 is attached to a tab 40 through an aperture 42 therein, the tab 40 being integrally attached, as by welding, to the exterior surface 18 of the body 12. The other end of the spring 38 is attached to a lever 44 through an aperture 46 therein, the lever 44 being integrally attached, as by welding, to the rotatable collar 26. See FIGS. 1-3. With this configuration, the lever 44 is used to actuate the rotatable collar 26 into the position wherein the recesses 36 in the rotatable collar 26 and the steel balls 14 are in alignment.

Advantageously, a U-shaped guide 48 restricts movement of the collar 26 such that the spring 38 is continually in tension on the one hand and such that the recesses 36 cannot overshoot alignment with the steel balls 14 upon actuation of the lever 44 on the other hand. As best seen in FIG. 2, the U-shaped guide 48 is preferably integrally attached, as by welding, to the exterior surface 18 of the body 12, just below the rotatable collar 26.

One skilled in the art will readily recognize that the rotatable collar 26 and corresponding recesses 36 therein comprise retraction means for temporarily retracting the steel balls 14 completely within the body 12 to allow ingress and egress of the ball-type hitch into and out of the cylindrical cavity 20, respectively.

The lever 44 may include an aperture 50, located in the distal end thereof, through which a cable 52 passes. The cable 52 is preferably attached at one end thereof to the aperture 50, such as by a loop, and the other end of the cable 52 is disposed near a location remote from the rotatable collar 26 at which the lever 44 is to be actuated. In this manner, the lever 44 for actuating the rotatable collar 26 can be operated from a location remote from the rotatable collar 26, thereby allowing ingress and egress of the ball-type hitch into and out of the cylindrical cavity 20, respectively, without having to climb into the bed of the lead vehicle when a gooseneck trailer is being used.

As a strengthening measure, a tempered steel pin 54 may be driven transversely through the closed end 24 of the cylindrical cavity 20 near the curved portion of the interior surface 16. The steel pin 54 may be welded or otherwise anchored in place in any fashion known in the art and provides additional structural integrity to the trailer hitch assembly 10. As a large portion of the weight of the trailer and its contents tend to push the trailer hitch assembly 10 downwardly against the ball-type hitch, thus causing a significant force therebetween, additional strengthening components within the trailer hitch assembly 10 are warranted for safety purposes.

The invention described herein may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A trailer hitch assembly for coupling a trailer to a lead vehicle being equipped with a standard ball-type hitch, said trailer hitch assembly comprising:

a body securely attached to the trailer having interior and exterior surfaces, the interior surface forming a cylindrical cavity, the cylindrical cavity being open at one end thereof for insertion of the ball-type hitch and the opposite end being closed, the interior surface at the closed end forming a curved surface which substantially conforms to a portion of the ball-type hitch, and the body further including a spring biased, rotatable collar;

a plurality of steel balls rotatably imbedded within the body such that a portion of each steel ball extends through the interior surface of the body into the cavity to secure the ball-type hitch within the cavity, the rotatable collar rotatably securing the steel balls in position, the rotatable collar including a recess for each steel ball and being actuatable to a position wherein the recesses and the steel balls are in alignment to allow the steel balls to completely retract into the recesses when the ball-type hitch passes thereby during ingress into and out of the cavity, respectively; and wherein the rotatable collar further includes a lever for actuating the rotatable collar into the position wherein the recesses and the steel balls are in alignment from the location remote from the rotatable collar, the lever including an aperture through which a cable passes, the cable being attached at one end thereof to the aperture and the other end thereof being disposed near the location remote from the rotatable collar at which the lever is to be actuated.

* * * * *